US009717728B2

(12) United States Patent
Gallagher et al.

(10) Patent No.: US 9,717,728 B2
(45) Date of Patent: Aug. 1, 2017

(54) PHARMACEUTICAL COMBINATION COMPRISING A B-RAF INHIBITOR AND A HISTONE DEACETYLASE INHIBITOR AND THEIR USE IN THE TREATMENT OF PROLIFERATIVE DISEASES

(71) Applicant: NOVARTIS AG, Basel (CH)

(72) Inventors: Stuart John Gallagher, Leichhardt (AU); Peter Hersey, Glebe (AU)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 14/441,750

(22) PCT Filed: Nov. 8, 2013

(86) PCT No.: PCT/EP2013/073452
§ 371 (c)(1),
(2) Date: May 8, 2015

(87) PCT Pub. No.: WO2014/072493
PCT Pub. Date: May 15, 2014

(65) Prior Publication Data
US 2015/0283136 A1  Oct. 8, 2015

Related U.S. Application Data

(60) Provisional application No. 61/723,925, filed on Nov. 8, 2012.

(51) Int. Cl.
A61K 31/506    (2006.01)
A61K 31/4045   (2006.01)
A61K 45/06     (2006.01)

(52) U.S. Cl.
CPC ........ A61K 31/506 (2013.01); A61K 31/4045 (2013.01); A61K 45/06 (2013.01)

(58) Field of Classification Search
CPC .................... A61K 31/506; A61K 31/4045
See application file for complete search history.

(56) References Cited

U.S. PATENT DOCUMENTS

| 5,717,100 | A | 2/1998 | Selnick et al. |
| 6,037,136 | A | 3/2000 | Beach et al. |
| 6,204,467 | B1 | 3/2001 | Greenholtz, Jr. et al. |
| 6,268,391 | B1 | 7/2001 | Dickerson et al. |
| 6,358,932 | B1 | 3/2002 | Monia et al. |
| 6,391,636 | B1 | 5/2002 | Monia et al. |
| 6,458,813 | B1 | 10/2002 | Mantlo et al. |
| 6,911,446 | B2 | 6/2005 | Tang et al. |
| 7,482,367 | B2 | 1/2009 | Aikawa et al. |
| 8,501,758 | B2 | 8/2013 | Huang et al. |
| 8,541,575 | B2 | 9/2013 | Pulici et al. |
| 8,791,265 | B2 | 7/2014 | Pulici et al. |
| 8,946,250 | B2 | 2/2015 | Pulici et al. |
| 9,114,137 | B2 | 8/2015 | Pulici et al. |
| 2001/0006974 | A1 | 7/2001 | Byrd et al. |
| 2002/0137774 | A1 | 9/2002 | Riedl et al. |
| 2008/0085902 | A1* | 4/2008 | Bold ............ A61K 31/502 514/252.01 |
| 2010/0022543 | A1 | 1/2010 | Melvin |
| 2011/0046370 | A1 | 2/2011 | Sim et al. |
| 2013/0053419 | A1 | 2/2013 | Pulici et al. |
| 2013/0217715 | A1 | 8/2013 | Pulici et al. |
| 2013/0296318 | A1 | 11/2013 | Huang et al. |
| 2014/0005150 | A1 | 1/2014 | Pulici et al. |
| 2014/0309250 | A1 | 10/2014 | Verma et al. |
| 2016/0120866 | A1 | 5/2016 | Huang et al. |
| 2016/0122324 | A1 | 5/2016 | Huang et al. |
| 2016/0263113 | A1 | 9/2016 | Huang et al. |
| 2016/0279129 | A1 | 9/2016 | Verma et al. |
| 2016/0280686 | A1 | 9/2016 | Huang et al. |
| 2016/0280687 | A1 | 9/2016 | Huang et al. |

FOREIGN PATENT DOCUMENTS

| JP | A 2011-515371 | 5/2011 |
| JP | A 2011-528698 | 11/2011 |
| JP | A 2012-512837 | 6/2012 |
| JP | A 2012-530099 | 11/2012 |
| JP | A 2013-503139 | 1/2013 |
| JP | 5475888 | 4/2014 |
| WO | WO 98/52940 | 11/1998 |
| WO | WO 00/31063 | 6/2000 |
| WO | WO 02/22577 | 3/2002 |
| WO | WO 03/055860 | 7/2003 |
| WO | WO 2005/068452 | 7/2005 |
| WO | WO 2005/123719 | 12/2005 |

(Continued)

OTHER PUBLICATIONS

"A Study of ARRY-438162 in Patients with Rheumatoid Arthritis," ClinicalTrials.gov, last updated Aug. 29, 2012, retrieved on Apr. 12, 2014, http://www.clinicaltrials.gov/ct2/show/NCT00650767?term=Arthritis&recr=Open, 3 pages.

"MEK Inhibitor MSC1936369B Plus FOLFIRI in Second Line K-Ras Mutated Metastatic Colorectal Cancer (mCRC)," ClinicalTrials.gov, last updated Oct. 21, 2013, retrived on Apr. 12, 2014, http://cliical trials.gov/ct2/show/NCT01085331?term-MSC1936369B&rank=1, 4 pages.

Arnold, "Synthetische Reaktionen Von dimethylformamid XVL* Formylierung Von y-Picolin," Coll. Czech. Chem. Commun., 1963, 28:863 (English Abstract).

Cohen et al., "BRAF Mutation in Papillary Thyroid Carcinoma," J. Natl. Cancer Inst., 2003, 95:625-627.

Cohen, "The development and therapeutic potential of protein kinase inhibitors," Current Opinion in Chemical Biology, 1999, 3:459-465.

Culbertson et al., "New 7-substituted quinolone antibacterial agents. The synthesis of 1-ethyl-I,4-dihydro-4-oxo-7-(2-thiazolyl and 4-thiazolyl)-3-quinolinecarboxylic acids," J. Heterocycl. Chem, 1987, 24:1509.

Davies et al., "Mutations of the BRAF Gene in Human Cancer," Nature, 2002, 417:949-954.

(Continued)

Primary Examiner — Yong Chu
(74) Attorney, Agent, or Firm — Fish & Richardson P.C.

(57) ABSTRACT

A pharmaceutical combination comprising (a) a B-Raf inhibitor and (b) a histone deacetylase inhibitor; the uses of such combination in the treatment of proliferative diseases; and methods of treating a subject suffering from a proliferative disease comprising administering a therapeutically effective amount of such combination.

9 Claims, No Drawings

(56) References Cited

FOREIGN PATENT DOCUMENTS

| WO | WO 2007/021966 | 2/2007 | |
|---|---|---|---|
| WO | WO 2007/024843 | 3/2007 | |
| WO | WO 2007/105058 | 9/2007 | |
| WO | WO 2007/123892 | 11/2007 | |
| WO | WO 2008/042639 | 4/2008 | |
| WO | WO 2008/045627 | 4/2008 | |
| WO | WO 2009/016460 | 2/2009 | |
| WO | WO2009/050291 | 4/2009 | |
| WO | WO 2009/062676 | 5/2009 | |
| WO | WO 2009/115572 | 9/2009 | |
| WO | WO 2009/137391 | 11/2009 | |
| WO | WO 2010/010154 | 1/2010 | |
| WO | WO 2010/034838 | 4/2010 | |
| WO | WO 2010/056662 | 5/2010 | |
| WO | WO 2010/100127 | 9/2010 | |
| WO | WO 2011/025927 | 3/2011 | |
| WO | WO 2011025927 A1 * | 3/2011 | ........... C07D 401/14 |
| WO | WO 2011/092088 | 8/2011 | |
| WO | WO 2011/126903 | 10/2011 | |
| WO | WO 2012/128709 | 9/2012 | |
| WO | WO 2012/174061 | 12/2012 | |

OTHER PUBLICATIONS

Dhirendra et al., "Solid dispersions: A review," Pak. J. Pharm Sci, Apr. 2009, 22(2):234-246.
Fremin and Meloche, "From basic research to clinical development of MEK 1/2 inhibitors for cancer therapy," J. Hematology and Oncology, 2010, 3:8.
Goodacre et al , "Imidazo[1,2-a]pyrimidines as Functionally Selective and Orally Bioavailable GABAxA[alpha]2/[alpha]3 binding Site Agonists for the Treatment of Anxiety Disorders," J. Med. Chem., 2006, 49(1):35-38.
Grimm et al., "A New Strategy for the Synthesis of Benzylic Sulfonamides: Palladium-Catalyzed Arylation and Sulfonamide Metathesis," J. Org. Chem, 2007, 72(21):8135-8138.
Hagemann and Rapp, "Isotope-specific functions of Raf kinases," Expt. Cell Res., 1999, 253:34-46.
Hingorani et al., "Suppression of BRAFV599E in Human Melanoma Abrogates Transformation," Cancer Res., 2003, 63:5198-520.
Hoshino et al., "Constitutive activation of the 41-/43-kDa mitogen-activated protein kinase signaling pathway in human tumors," Oncogene, 1999, 18:813-822.
International Preliminary Report on Patentability in International Application No. PCT/EP2009/0595506, dated Jan. 25, 2011, 6 pages.
International Preliminary Report on Patentability in International Application No. PCT/EP2011/050654, dated Jul. 31, 2012, 6 pages.
International Preliminary Report on Patentability in International Application No. PCT/EP2013/073452, dated May 12, 2015, 7 pages.
International Preliminary Report on Patentability in International Application No. PCT/US2010/046930, dated Feb. 28, 2012, 8 pages.
International Preliminary Report on Patentability in International Application No. PCT/US2012/066185, dated, May 27, 2014, 8 pages.
International Report on Patentability in International Application No. PCT/EP2011/063325, dated Feb. 5, 2013, 8 pages.
International Search Report and Written Opinion in International Application No. PCT/US2012/066185, dated Mar. 5, 2013, 13 pages.
International Search Report in International Application No. PCT/EP2009/059506, dated Sep. 23, 2009, 3 pages.
International Search Report in International Application No. PCT/EP2011/050654, dated Apr. 6, 2011, 4 pages.
International Search Report in International Application No. PCT/EP2011/063325, dated Aug. 31, 2011, 3 pages.
International Search Report in International Application No. PCT/EP2013/073452, dated Dec. 13, 2013, 5 pages.
International Search Report in International Application No. PCT/US2010/046930, dated Oct. 19, 2010, 5 pages.
Japanese Preliminary Examination Report in Japanese Application No. 2014-098022, dated Nov. 18, 2015, 5 pages (with English Translation).
Kolch et al., "The role of Raf kinases in malignant transformation," Exp. Rev. Mol. Med, http://citeseerx.ist.psu.edu/viewdoc/download?doi=10.1.1.114.8626&rep=rep1&type=pdf, Apr. 25, 2002,18 pages.
Lai et al., "Cotargeting histone deacetylases and oncongenic BRAF synergistically kills human melanoma cells by necrosis independently of RIPK1 and RIPK3," Cell Death and Disease, 2013, 4:e655, 13 pages.
McCubrey et al., "Emerging MEK inhibitors," Expert Opinion Emerging Drugs, Inform Healthcare, 2010, 15(2):203-223.
McLaughlin et al., "A Simple, Modular method for the Synthesis of 3,4,5-Trisubstituted Pyrazoles," JOC 2008, 73:4309-4312.
Mercer and Pritchard, "Raf proteins and cancer: B-Raf is identified as a mutational target," Biochim Biophys. Acta, 2003, 1653:25-40.
Peyssonnaux and Eychene, "The Raf/MEK/ERK pathway: new concepts of activation," Biology of the Cell, 2001, 93:53-62.
Raju et al., "Inhibition of DNA Repair as a Mechanism of Enhanced Radioresponse of Head and Neck Carcinoma Cells by a Selective Cyclooxygenase-2 Inhibitor, Celecoxib," Int. J. Radiation Oncology Biol. Phys., 2005, 53:520-528.
Saulnier et al., "An Efficient method for the Synthesis of Guanidino Prodrugs," Bioorganic and Medicinal Chemistry Letters, 1994, 4:1985.
Sherman et al., "Biologically targeted therapies for thyroid cancers," Thyroid Cancer, Jan. 2011, 329-349.
Tannapfel et al., "Mutations of the BRAF gene in cholangiocardinoma but not the hepatocellular carcinoma," Gut, 2003, 52:706-712.
Tran et al., "Dissolution-modulating mechanism of pH modifiers in solid dispersion containing weakly acidic or basic drugs with poor water solubility," Expert. Opin. Drug Deliv., Dec. 2010, 7(5):647-661.
Trivedi et al., "Novel dihydropyrimidines as a potential new class of antitubercular agents," Bioorganic & medicinal Chemistry Letters, 2010, 20:6100-6102.
Velculescu, "Defining the Blueprint of the Cancer Genome," Carcinogenesis, 2008, 29:1087-1091.
Wellbrock et al., "B-RAF is an Oncogene in Melanocytes," Cancer Res., 2004, 64:2338-2342.
Wojnowski et al., "Endothelial apoptosis in Braf-deficient mice," Nature Genet., 1997, 16:293-297.
Written Opinion in International Application No. PCT/EP2013/073452, dated Dec. 13, 2013, 6 pages.
Written Opinion of the International Searching Authority in International Application No. PCT/EP2009/0595506, dated Sep. 23, 2009, 5 pages.
Written Opinion of the International Searching Authority in International Application No. PCT/EP2011/050654, dated Apr. 6, 2011, 5 pages.
Written Opinion of the International Searching Authority in International Application No. PCT/EP2011/063325, dated Feb. 3, 2013, 6 pages.
Written Opinion of the International Searching Authority in International Application No. PCT/US2010/046930, dated Oct. 9, 2010, 7 pages.
Young et al., "Discovery and evaluation of potent P1 aryl heterocycle-based thrombin inhibitors," J. Med. Chem., 2004. 47:2995-3008.

* cited by examiner

PHARMACEUTICAL COMBINATION COMPRISING A B-RAF INHIBITOR AND A HISTONE DEACETYLASE INHIBITOR AND THEIR USE IN THE TREATMENT OF PROLIFERATIVE DISEASES

CROSS REFERENCE TO RELATED APPLICATIONS

This application is a National Stage application under 35 U.S.C. 371 of International Application No. PCT/EP2013/073452, having an International Filing Date of Nov. 8, 2013, which claims the benefit of U.S. Provisional Application Ser. No. 61/723,925, filed Nov. 8, 2012. The disclosures of the prior applications are considered part of (and are incorporated by reference in) the disclosure of this application.

FIELD OF THE INVENTION

A combination of a B-Raf kinase inhibitor and a histone deacetylase inhibitor which is used for the treatment of proliferative diseases. This invention also relates to the uses of such a combination in the treatment of proliferative diseases; to pharmaceutical compositions of the combination of agents and to methods of treating a subject suffering from a proliferative disease comprising administering a therapeutically effective amount of such a combination to the subject.

BACKGROUND OF THE INVENTION

The protein kinases represent a large family of proteins, which play a central role in the regulation of a wide variety of cellular processes and maintaining control over cellular function. Aberrant kinase activity has been observed in many disease states including benign and malignant proliferative disorders as well as diseases resulting from inappropriate activation of the immune and nervous systems.

The Ras-Raf-MEK-ERK signaling pathway transmits signals from cell surface receptors to the nucleus and is essential for cell proliferation and survival. Since 10-20% of human cancers harbor oncogenic Ras mutation and many human cancers have activated growth factor receptors, this pathway is an ideal target for intervention.

The Raf family of serine/threonine kinases include three members: C-Raf (or Raf-1), B-Raf and A-Raf. Activating alleles of B-Raf have been identified in ~70% of melanomas, 40% of papillary thyroid carcinoma, 30% of ovarian low-grade carcinoma, and 10% of colorectal cancers. Most B-Raf mutations are found within the kinase domain, with a single substitution (V600E) accounting for 80%. The mutated B-Raf proteins activate Raf-MEK-ERK pathway either via elevated kinase activity toward MEK or via activating C-Raf. The B-Raf inhibitor in the present combination therapy inhibits cellular processes involving B-Raf kinase by blocking the signal cascade in these cancer cells and ultimately inducing stasis and/or death of the cells.

Reversible acetylation of histones is a major regulator of gene expression that acts by altering accessibility of transcription factors to DNA. In normal cells, histone deacetylase (HDA) and histone acetyltrasferase together control the level of acetylation of histones to maintain a balance. Inhibition of HDA results in the accumulation of hyper-acetylated histones, which results in a variety of cellular responses. Histone deacetylase inhibitors have been studied for their therapeutic effects on cancer cells. Recent developments in the field of histone deacetylase inhibitor research have provided active compounds, both highly efficacious and stable, that are suitable for treating proliferative diseases.

The present invention is based on the discovery that the cell cycle inhibition and apoptosis resulting from B-Raf inhibition is enhanced if treatment with the B-Raf inhibitor is combined with treatment with a histone deacetylase inhibitor. The histone deacetylase inhibitor sensitizes melanoma cells to B-Raf induced death, even in cells with previously acquired resistance to B-Raf inhibitors.

SUMMARY OF THE INVENTION

The present invention relates to a therapeutic combination comprising: (a) a B-Raf inhibitor and (b) a histone deacetylase inhibitor, useful for separate, simultaneous or sequential administration to a subject in need thereof for treating or preventing a proliferative disease.

B-Raf inhibitors and their use for treating proliferative diseases are known in the art. Vemurafenib (PLX4032) is a BRAF inhibitor which was approved by the FDA for the treatment of patients with melanoma whose tumors express a gene mutation called BRAF V600E. The benzimidazolyl pyridyl ethers, disclosed in U.S. Pat. No. 7,482,367, which is here incorporate by reference in its entirety, also discloses B-Raf inhibitors useful in the present combinations. The pyrrazole pyrimidines, which are disclosed in WO 2011/025927 and which is here incorporate by reference in its entirety, are another class of B-Raf inhibitors useful for the present combinations.

A preferred B-Raf inhibitor for the present combinations is the compound of Formula (I)

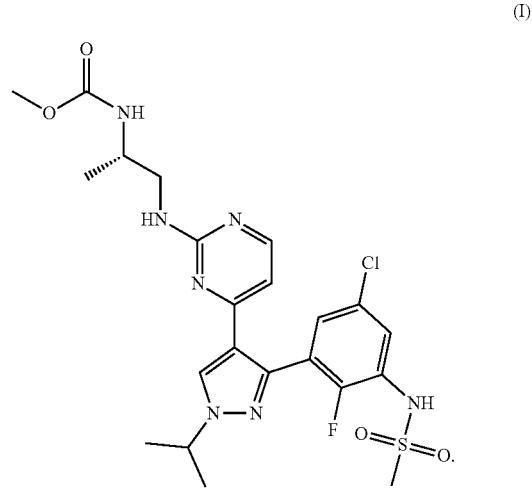 [SMILES: COC(=O)N[C@@H](C)CNc1nccc(-c2cn(C(C)C)nc2-c2cc(Cl)cc(NS(C)(=O)=O)c2F)n1]

Histone deacetylase inhibitors are also known in the art. Such compounds include Belinostat, Panobinostat, Trichostatin A, BL-1521, PX-118490, CUDC-101, Pracinostat, Vorinostat, ONO-4817, Tosedostat, Pyroxamide, Batimastat, Tefinostat and Bufexamac.

Panobinostat is an especially useful histone deacetylase inhibitor for use in the inventive combinations. Panobinostat has the chemical name N-hydroxy-3-[4-[[[2-(2-methyl-1H-indol-3-yl-ethyl]-amino]methyl]phenyl]-2E-2-propenamide, and is disclosed in published PCT patent application WO02/22577, which is hereby incorporated by reference in its entirety. Panobinostat has the chemical formula

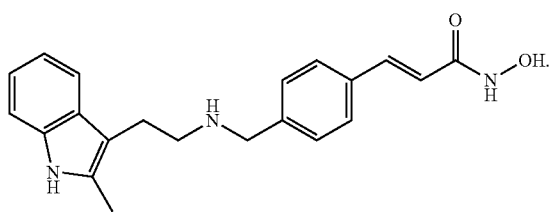 [SMILES: Cc1[nH]c2ccccc2c1CCNCc1ccc(/C=C/C(=O)NO)cc1]

DETAILED DESCRIPTION OF THE INVENTION

The present invention relates to a therapeutic combination comprising: (a) a B-Raf inhibitor and (b) a histone deacetylase inhibitor, for separate, simultaneous or sequential administration.

The present invention especially relates to a therapeutic combination comprising:

(a) a B-Raf inhibitor of the formula (I)

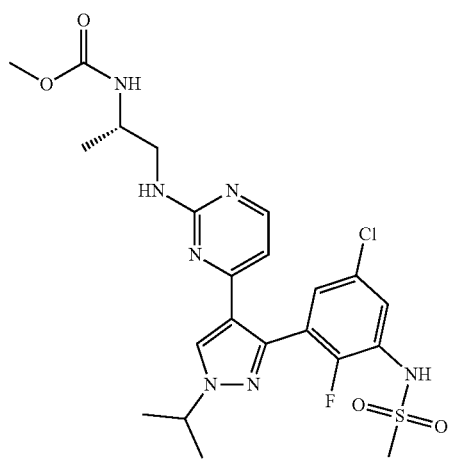

(I)

or a pharmaceutically acceptable salt thereof, and (b) a histone deacetylase inhibitor.

Useful combinations covered by this aspect of the invention include those wherein the histone deacetylase inhibitor is Belinostat, Panobinostat, Trichostatin A, BL-1521, PX-118490, CUDC-101, Pracinostat, Vorinostat, ONO-4817, Tosedostat, Pyroxamide, Batimastat, Tefinostat or Bufexamac.

The present invention further relates to a pharmaceutical combination comprising:

(a) a B-Raf inhibitor, and (b) the histone deacetylase inhibitor, panobinostat, or a pharmaceutically acceptable salt thereof.

Useful combinations covered by this aspect of the invention include those wherein the B-Raf inhibitor is vemurafenib, RAF265 or the compound of Formula (I).

The present invention specifically relates to a pharmaceutical combination comprising:

(a) a B-Raf inhibitor of the formula (I)

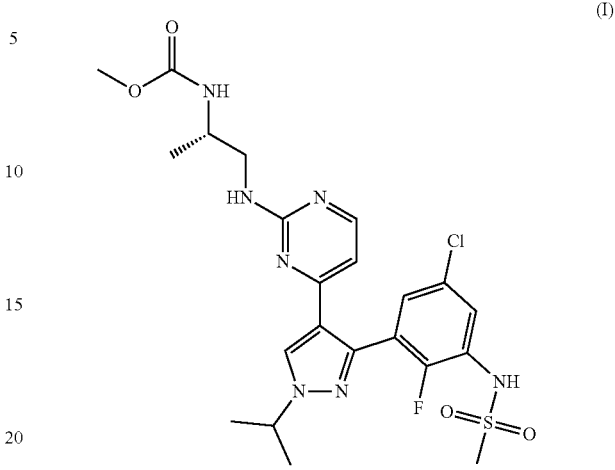

(I)

or a pharmaceutically acceptable salt thereof, and (b) the histone deacetylase inhibitor panobinostat, or a pharmaceutically acceptable salt thereof.

Hereinafter, combinations of a B-Raf inhibitor and a histone deacetylase inhibitor, combinations of a B-Raf inhibitor of Formula (I) and a histone deacetylase inhibitor, combinations of a B-Raf inhibitor and the histone deacetylase inhibitor panobinostat, and combinations of the B-Raf inhibitor of Formula (I) and the histone deacetylase inhibitor, panobinostat, will be referred to individually and collectively as a COMBINATION OF THE INVENTION.

The present invention particularly pertains to a COMBINATION OF THE INVENTION useful for separate, simultaneous or sequential administration to a subject in need thereof for treating or preventing a proliferative disease.

The present invention also pertains to a COMBINATION OF THE INVENTION for use in the preparation of a pharmaceutical composition or medicament for the treatment or prevention of a proliferative disease in a subject in need thereof.

The present invention further pertains to the use of a COMBINATION OF THE INVENTION for the preparation of a pharmaceutical composition or medicament for the treatment or prevention of a proliferative disease.

The present invention relates to a method of treating a subject having a proliferative disease comprising administering to said subject a COMBINATION OF THE INVENTION in a quantity which is jointly therapeutically effective against a proliferative disease.

The present invention further provides a commercial package comprising as therapeutic agents a COMBINATION OF THE INVENTION, together with instructions for simultaneous, separate or sequential administration thereof for use in the delay of progression or treatment of a proliferative disease.

The general terms used herein are defined with the following meanings, unless explicitly stated otherwise:

The terms "comprising" and "including" are used herein in their open-ended and non-limiting sense unless otherwise noted.

The terms "a" and "an" and "the" and similar references in the context of describing the invention (especially in the context of the following claims) are to be construed to cover both the singular and the plural, unless otherwise indicated herein or clearly contradicted by context. Where the plural form is used for compounds, salts, and the like, this is taken to mean also a single compound, salt, or the like.

The term "combination", "therapeutic combination" or "pharmaceutical combination", as used herein, defines either a fixed combination in one dosage unit form or a kit of parts for the combined administration where the individual combination partners (a) and (b) may be administered independently at the same time or separately within time intervals that allow that the combination partners show a cooperative, e.g., synergistic, effect.

The term "pharmaceutical composition" is defined herein to refer to a mixture or solution containing at least one therapeutic agent to be administered to a subject, e.g., a mammal or human, in order to prevent or treat a particular disease or condition affecting the mammal.

The term "pharmaceutically acceptable" is defined herein to refer to those compounds, materials, compositions and/or dosage forms, which are, within the scope of sound medical judgment, suitable for contact with the tissues a subject, e.g., a mammal or human, without excessive toxicity, irritation allergic response and other problem complications commensurate with a reasonable benefit/risk ratio.

The term "a combined preparation" is defined herein to refer to especially a "kit of parts" in the sense that the combination partners (a) and (b) as defined above can be dosed independently or by use of different fixed combinations with distinguished amounts of the combination partners (a) and (b), i.e., simultaneously or at different time points. The parts of the kit of parts can then e.g., be administered simultaneously or chronologically staggered, that is at different time points and with equal or different time intervals for any part of the kit of parts. The ratio of the total amounts of the combination partner (a) to the combination partner (b) to be administered in the combined preparation can be varied, e.g., in order to cope with the needs of a patient sub-population to be treated or the needs of the single patient.

The term "co-administration" or "combined administration" as used herein is defined to encompass the administration of the selected therapeutic agents to a single patient, and are intended to include treatment regimens in which the agents are not necessarily administered by the same route of administration or at the same time.

The term "treating" or "treatment" as used herein comprises a treatment relieving, reducing or alleviating at least one symptom in a subject or effecting a delay of progression of a disease. For example, treatment can be the diminishment of one or several symptoms of a disorder or complete eradication of a disorder, such as cancer. Within the meaning of the present invention, the term "treat" also denotes to arrest, delay the onset (i.e., the period prior to clinical manifestation of a disease) and/or reduce the risk of developing or worsening a disease. The term "protect" is used herein to mean prevent, delay or treat, or all, as appropriate, development or continuance or aggravation of a disease in a subject.

The term "jointly therapeutically active" or "joint therapeutic effect" means that the therapeutic agents may be given separately (in a chronologically staggered manner, especially a sequence-specific manner) in such time intervals that they prefer, in the warm-blooded animal, especially human, to be treated, still show a (preferably synergistic) interaction (joint therapeutic effect). Whether this is the case can, inter alia, be determined by following the blood levels, showing that both compounds are present in the blood of the human to be treated at least during certain time intervals.

The term "pharmaceutically effective amount" or "clinically effective amount" or "therapeutically effective amount" of a combination of therapeutic agents is an amount sufficient to provide an observable improvement over the baseline clinically observable signs and symptoms of the disorder treated with the combination.

The term "subject" or "patient" as used herein includes animals, which are capable of suffering from or afflicted with a cancer or any disorder involving, directly or indirectly, a cancer. Examples of subjects include mammals, e.g., humans, dogs, cows, horses, pigs, sheep, goats, cats, mice, rabbits rats and transgenic non-human animals. In the preferred embodiment, the subject is a human, e.g., a human suffering from, at risk of suffering from, or potentially capable of suffering from cancers.

The term about" or "approximately" shall have the meaning of within 10%, more preferably within 5%, of a given value or range.

The combination partners (a) and (b) may be administered in free form or in pharmaceutically acceptable salt form.

A "pharmaceutically acceptable salt", as used herein, unless otherwise indicated, includes salts of acidic and basic groups which may be present in the compounds of the present invention. The compounds of the present invention that are basic in nature are capable of forming a wide variety of salts with various inorganic and organic acids. The acids that may be used to prepare pharmaceutically acceptable acid addition salts of such basic compounds of the present invention are those that form non-toxic acid addition salts, i.e., salts containing pharmaceutically acceptable anions, such as the acetate, benzoate, bromide, chloride, citrate, fumarate, hydrobromide, hydrochloride, iodide, lactate, maleate, mandelate, nitrate, oxalate, salicylate, succinate, and tartrate salts. Panobinostat is especially administered as its lactate salt. The B-Raf inhibitor of Formula (I) is especially administered as the free base in a solid dispersion or microemulsion formulation.

Unless otherwise specified, or clearly indicated by the text, reference to therapeutic agents useful in the COMBINATION OF THE INVENTION includes both the free base of the compounds, and all pharmaceutically acceptable salts of the compounds.

The present invention also pertains to a combination such as a combined preparation or a pharmaceutical composition which comprises A COMBINATION OF THE INVENTION, especially a combined preparation or a pharmaceutical composition which comprises (a) a B-Raf inhibitor of the formula (I)

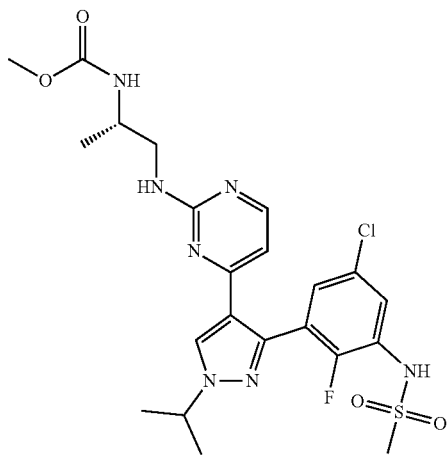

(I)

or a pharmaceutically acceptable salt thereof, and (b) the histone deacetylase inhibitor panobinostat, or a pharmaceutically acceptable salt thereof.

The present invention particularly pertains to a COMBINATION OF THE INVENTION useful for treating or preventing a proliferative disease in a subject in need thereof. In this embodiment of the present invention, the COMBINATION OF THE INVENTION is used for the treatment or prevention of a proliferative disease comprising administering to the subject a combination therapy, for example, comprising an effective amount of a B-Raf inhibitor of the Formula I and panobinostat. Preferably, these inhibitors are administered at therapeutically effective dosages which, when combined, provide a beneficial effect. The administration may be separate, simultaneous or sequential.

In one embodiment, the proliferative disease is cancer. The term "cancer" is used herein to mean a broad spectrum of tumors, including all solid tumors and hematological malignancies. Examples of such tumors include but are not limited to benign or malignant tumors of the brain, lung (in particular small-cell lung cancer and non-small cell lung cancer), squamous cell, bladder, gastric, pancreatic, breast, head and neck, renal, kidney, ureter, ovarian, prostate, colorectal, esophageal, testicular, gynecological (e.g., uterine sarcomas, carcinoma of the fallopian tubes, endometrial, cervix, vagina or vulva), thyroid, pancreatic, bone, skin, melanoma, uterine, ovarian, rectal, anal, colon, testicular, Hodgkin's disease, esophageal, small intestine, endocrine system (e.g., thyroid, parathyroid, or adrenal glands), sarcomas of soft tissues, urethra, penis, leukemia, lymphomas, neoplasms of the central nervous system, sarcomas, myeloma, biliary, liver, neurofibromatosis, acute myelogenous leukemia (AML), myelodysplastic syndromes (MDS), and Kaposi's sarcoma.

In a further embodiment of the present invention, the proliferative disease is melanoma, lung cancer (including non-small cell lung cancer (NSCLC)), colorectal cancer (CRC), breast cancer, kidney cancer such as e.g., renal cell carcinoma (RCC), liver cancer, endometrial cancer, acute myelogenous leukemia (AML), myelodysplastic syndromes (MDS), thyroid cancer, particularly papillary thyroid cancer, pancreatic cancer, neurofibromatosis or hepatocellular carcinoma.

In a further embodiment of the present invention, the proliferative disease is a solid tumor. The term "solid tumor" especially means melanoma, breast cancer, ovarian cancer, colorectal cancer, and generally gastrointestinal tract, cervix cancer, lung cancer (including small-cell lung cancer and non-small cell lung cancer), head and neck cancer, bladder cancer, prostate cancer or Kaposi's sarcoma. The present combination inhibits the growth of solid tumors and also liquid tumors. Further, depending on the tumor type and particular combination used, a decrease of the tumor volume can be obtained. The COMBINATION OF THE INVENTION disclosed herein is also suited to prevent the metastatic spread of tumors and the growth or development of micrometastases. The COMBINATION OF THE INVENTION disclosed herein is suitable for the treatment of poor prognosis patients, especially such poor prognosis patients having metastatic melanoma, colorectal or pancreatic cancer. The COMBINATION OF THE INVENTION is particularly useful for treating patients with previously acquired resistance to treatment with a B-Raf inhibitor.

In a further embodiment, the proliferative disease is melanoma or colorectal cancer, particularly melanoma or colorectal cancer with resistance to treatment with a B-Raf inhibitor.

The COMBINATION OF THE INVENTION is particularly useful for the treatment of cancers having a genetic alteration in the RAS/RAF/MEK signal transduction pathway such as, for example, a B-Raf mutation or gene amplification.

In an important embodiment, the cancer to be treated is characterized by a B-Raf mutation, e.g., B-Raf mutated colorectal cancer and melanoma, particularly such melanoma or colorectal cancer with resistance to treatment with a B-Raf inhibitor. In particular, the B-Raf mutation is a V600 mutation, for example a V600E, V600K or V600G mutation.

The nature of proliferative diseases is multifactorial. Under certain circumstances, drugs with different mechanisms of action may be combined. However, just considering any combination of therapeutic agents having different mode of action does not necessarily lead to combinations with advantageous effects.

The administration of a pharmaceutical combination of the invention may result not only in a beneficial effect, e.g. a synergistic therapeutic effect, e.g. with regard to alleviating, delaying progression of or inhibiting the symptoms, but also in further surprising beneficial effects, e.g. fewer side-effects, more durable response, an improved quality of life or a decreased morbidity, compared with a monotherapy applying only one of the pharmaceutically therapeutic agents used in the combination of the invention.

A further benefit is that lower doses of the therapeutic agents of the COMBINATION OF THE INVENTION can be used, for example, that the dosages need not only often be smaller, but are also applied less frequently, or can be used in order to diminish the incidence of side-effects observed with one of the combination partners alone. This is in accordance with the desires and requirements of the patients to be treated.

It can be shown by established test models that a COMBINATION OF THE INVENTION results in the beneficial effects described herein before. The person skilled in the art is fully enabled to select a relevant test model to prove such beneficial effects. The pharmacological activity of a COMBINATION OF THE INVENTION may, for example, be demonstrated in a cell line study as described hereinafter.

According to a further aspect, the present invention provides a synergistic combination for administration to humans comprising the B-Raf inhibitor of Formula I and panobinostat where the dose range of each component corresponds to the synergistic ranges suggested in a suitable in vitro tumor model or clinical study. In general, the B-Raf inhibitor of Formula I is administered in a dose in the range from 10 mg to 450 mg per day, more particularly, 50 to 350 mg per day, for example, 100, 200 or 300 mg per day, and panobinostat is administered in a dose in the range from 100-1,500 mg daily, e.g., 200-1,000 mg per day, such as 200, 400, 500, 600, 800, 900 or 1,000 mg per day, administered in one or two doses daily.

It is one objective of this invention to provide a pharmaceutical composition, comprising the COMBINATION OF THE INVENTION which is jointly therapeutically effective against a proliferative disease. In this composition, the combination partners (a) and (b) can either be administered in a single formulation or unit dosage form, administered concurrently but separately, or administered sequentially by any suitable route. The unit dosage form may also be a fixed combination.

The pharmaceutical compositions for separate administration of both combination partners, or for the administration in a fixed combination, i.e. a single galenical composition comprising the COMBINATION OF THE INVENTION, may be prepared in a manner known per se and are those suitable for enteral, such as oral or rectal, and parenteral administration to mammals (warm-blooded animals), including humans, comprising a therapeutically effective amount of at least one pharmacologically active combination partner alone, e.g. as indicated above, or in combination with one or more pharmaceutically acceptable carriers, especially suitable for enteral or parenteral application.

The novel pharmaceutical composition contains may contain, from about 0.1% to about 99.9%, preferably from about 1% to about 60%, of the therapeutic agent(s).

Suitable pharmaceutical compositions for the combination therapy for enteral or parenteral administration are, for example, those in unit dosage forms, such as sugar-coated tablets, tablets, capsules or suppositories, or ampoules. If not indicated otherwise, these are prepared in a manner known per se, for example by means of various conventional mixing, comminution, direct compression, granulating, sugar-coating, dissolving, lyophilizing processes, melt granulation, or fabrication techniques readily apparent to those skilled in the art. It will be appreciated that the unit content of a combination partner contained in an individual dose of each dosage form need not in itself constitute an effective amount since the necessary effective amount may be reached by administration of a plurality of dosage units.

In one embodiment, the present invention also pertains to a COMBINATION OF THE INVENTION for use in the preparation of a pharmaceutical composition or medicament for the treatment or prevention of a proliferative disease in a subject in need thereof.

In accordance with the present invention, a therapeutically effective amount of each of the combination partners of the COMBINATION OF THE INVENTION may be administered simultaneously or sequentially and in any order, and the components may be administered separately or as a fixed combination. For example, the method of treating a proliferative disease according to the invention may comprise (i) administration of the agent (a) in free or pharmaceutically acceptable salt form and (ii) administration of agent (b) in free or pharmaceutically acceptable salt form, simultaneously or sequentially in any order, in jointly therapeutically effective amounts, preferably in synergistically effective amounts, e.g. in daily or intermittently dosages corresponding to the amounts described herein. The individual combination partners of the COMBINATION OF THE INVENTION may be administered separately at different times during the course of therapy or concurrently in divided or single combination forms. The invention is therefore to be understood as embracing all such regimens of simultaneous or alternating treatment and the term "administering" is to be interpreted accordingly.

The effective dosage of each of the combination partners employed in the COMBINATION OF THE INVENTION may vary depending on the particular compound or pharmaceutical composition employed, the mode of administration, the condition being treated, and the severity of the condition being treated. Thus, the dosage regimen of the COMBINATION OF THE INVENTION is selected in accordance with a variety of factors including the route of administration and the renal and hepatic function of the patient. A clinician or physician of ordinary skill can readily determine and prescribe the effective amount of the single therapeutic agents required to alleviate, counter or arrest the progress of the condition.

The optimum ratios, individual and combined dosages, and concentrations of the combination partners (a) and (b) of the COMBINATION OF THE INVENTION that yield efficacy without toxicity are based on the kinetics of the therapeutic agents' availability to target sites, and are determined using methods known to those of skill in the art.

The effective dosage of each of the combination partners may require more frequent administration of one of the compound(s) as compared to the other compound(s) in the combination. Therefore, to permit appropriate dosing, packaged pharmaceutical products may contain one or more dosage forms that contain the combination of compounds, and one or more dosage forms that contain one of the combination of compounds, but not the other compound(s) of the combination.

When the combination partners, which are employed in the COMBINATION OF THE INVENTION, are applied in the form as marketed as single drugs, their dosage and mode of administration can be in accordance with the information provided on the package insert of the respective marketed drug, if not mentioned herein otherwise.

The optimal dosage of each combination partner for treatment of a proliferative disease can be determined empirically for each individual using known methods and will depend upon a variety of factors, including, though not limited to, the degree of advancement of the disease; the age, body weight, general health, gender and diet of the individual; the time and route of administration; and other medications the individual is taking. Optimal dosages may be established using routine testing and procedures that are well known in the art.

The amount of each combination partner that may be combined with the carrier materials to produce a single dosage form will vary depending upon the individual treated and the particular mode of administration. In some embodiments the unit dosage forms containing the combination of agents as described herein will contain the amounts of each agent of the combination that are typically administered when the agents are administered alone.

Frequency of dosage may vary depending on the compound used and the particular condition to be treated or prevented. In general, the use of the minimum dosage that is sufficient to provide effective therapy is preferred. Patients may generally be monitored for therapeutic effectiveness using assays suitable for the condition being treated or prevented, which will be familiar to those of ordinary skill in the art.

The present invention relates to a method of treating a subject having a proliferative disease comprising administered to said subject a COMBINATION OF THE INVENTION in a quantity, which is jointly therapeutically effective against a proliferative disease. In particular, the proliferative disease to be treated with a COMBINATION OF THE INVENTION is a melanoma or colorectal cancer, particularly a B-Raf mutated melanoma or colorectal cancer, for example, a V600 B-Raf mutated melanoma or colorectal cancer, particularly such a B-Raf mutated melanoma or colorectal cancer which is resistant to treatment with a B-Raf inhibitor, such as vemurafenib or the compound of Formula I. Furthermore, the treatment can comprise surgery or radiotherapy.

The present invention further relates to the COMBINATION OF THE INVENTION for use in the treatment of a proliferative disease, particularly cancer.

The present invention further provides a commercial package comprising as therapeutic agents the COMBINATION OF THE INVENTION, together with instructions for simultaneous, separate or sequential administration thereof for use in the delay of progression or treatment of a proliferative disease in a subject in need thereof.

The following Examples illustrate the invention described above; they are not, however, intended to limit the scope of the invention in any way. The beneficial effects of the pharmaceutical combination of the present invention can also be determined by other test models known as such to the person skilled in the pertinent art.

Example 1

Methods

| | |
|---|---|
| Cell lines | Mel-P1-pre; Mel-P1-post; Mel-P3-pre and Mel-P3-post cell lines were established from melanoma tumours in patients before and after vemurafenib. Cultures were established by transferring fresh melanoma material from the patients into RPMI media supplemented with 10% fetal calf serum and penicillin/streptomycin. |
| Western Blots | Cells were plated into tissue culture dishes and the next day the media was changed with fresh media containing either a DMSO carrier control; 5 uM B-Raf inhibitor of Formula (I); 30 nM Panobinostat or a combination of both of the agents (COMBO) for the indicated length of time. Proteins were extracted from cells for 30 minutes at 4° C. using radio-immunoprecipitation (RIPA) buffer (1% NP40, 0.5% sodium deoxycholate, 0.1% SDS in PBS) with protease inhibitors (Roche, Basel, Switzerland). The protein concentration was determined with the Dc Protein Assay Kit (Bio-Rad, Hercules, California). Proteins (40 μg) were resolved on 12% SDS-polyacrylamide gels and transferred to Immobilon-P membranes (Millipore, Billerica, Massachusetts) at 15 mA/cm2 for 2 h using a semi-dry Bio-Rad transfer apparatus. Membranes were blocked with 5% skim milk powder in Tris-buffered saline (TBS). Membranes were probed with primary antibody diluted in 0.5% Tween/TBS (TTBS) for at least two hours, then subjected to three washes of five minutes each. Secondary antibodies were diluted 1:3000 in TTBS and applied for one hour at room temperature. The membranes were then washed four times in TTBS for 15-20 minutes each and developed with IMMUNO-STAR HRP PEROXIDE BUFFER enhanced chemiluminescence solution (Bio-Rad) using a LAS-3000 (FujiFilm).<br>Primary antibodies used were:<br>ERK1/2 (#9102, Cell Signalling); p-ERK (sc-7974, Santa Cruz); PARP-1 (sc-8007, Santa Cruz); .HDAC1(sc-81598, Santa Cruz); HDAC2 (sc-55541, Santa Cruz); HDAC3 (sc-130319, Santa Cruz); HDAC8 (sc-56687, Santa Cruz); GAPDH (sc-32233, Santa Cruz).<br>Secondary Antibodies used were:<br>anti-mouse IgG-HRP (1706516, Bio-Rad); anti-rabbit-IgG-HRP (1706515, Bio-Rad). |
| Flow cytometry analysis of cell death and phenotype | Flow cytometry was used to determine cell death using a cell cycle or annexin assay. Additionally, mitochondrial depolarisation was measured with the mitochondrial dye JC-1, and caspase activation measured using the dye z-VAD-FMK-FITC. In all these experiments, cells were plated into tissue culture dishes and the next day the media was changed with fresh media containing the indicated concentration of B-Raf inhibitor of Formula (I) and/or panobinostat. Where no concentration is presented, cells were treated with 5 uM B-Raf inhibitor of Formula (I) and 30 nM panobinstat. After 48 hours, adherent and floating cells were collected and combined and stained for flow cytometric analysis as detailed below. |
| Cell Cycle Flow cytometry | For cell cycle analysis, cells were stained with a solution containing 0.1% Triton-X, propidium iodide (50 ng/μl) (Sigma, St. Louis, Missouri) and ribonuclease A (50 ng/μl)(Worthington Biochemical Corp, Lakewood, New Jersey). DNA content from at least 2000 cells was analysed using ModFIT software (Verity Software, USA). Numbers of cells with sub-G1 content were determined using CellQuest software (Becton Dickinson, Franklin Lakes, New Jersey). The sub-G1 contents is an indicator of cell death. |
| Annexin-V analysis | Annexin-V staining was performed using APC- conjugated annexin-V as detailed by the manufacturer (BD Biosciences, Franklin Lakes, New Jersey). Cells that stain positive for annexin and/or PI (y-axis) are apoptotic or necrotic. |
| JC-1 | JC-1 assays were performed by sedimenting harvested cells at 2000 rpm for 5 min on a desk-top centrifuge then resuspending the cells in warm complete RPMI containing 10 μM JC-1 (Molecular Probes, Eugene, Oregon). Cells were incubated at 37° C. for 20 minutes in the dark, washed |

|  |  |
|---|---|
| z-VAD-FMK-FITC analysis. | once in PBS, then resuspended in PBS and analysed by flow cytometry. Cells showing a shift in fluorescence from green to red were judged to have loss of mitochondrial potential.<br>JC-1 assays were performed by sedimenting harvested cells at 2000 rpm for 5 min on a desk-top centrifuge then resuspending the cells in warm complete RPMI containing 10 μM z-VAD-FMK-FITC (Molecular Probes, Eugene, Oregon) Cells were incubated at 37° C. for 30 minutes in the dark, washed once in PBS, then resuspended in PBS and analysed by flow cytometry. Cells showing an increase in green fluorescence were judged to have activated caspases. |

Results:

Cell lines: Mel-PX-Pre and Mel-PX-post represent cell lines derived from patient-X pre- and post-treatment with vemurafenib.

Therapeutic agents: B-Raf is the B-Raf inhibitor of Formula I and HDAI is panobinostat SD is standard deviation

| Sub-G1 analysis of dead cells (more cell lines) | | | | |
|---|---|---|---|---|
| Cell line | B-Raf uM | HDAI nM | sub-G1 % | SD |
| Mel-P3-Pre | 0 | 0 | 3 | 1 |
| Mel-P3-Pre | 10 | 0 | 20 | 3 |

| Cell Cycle staining and sub-G1 analysis of dead cells | | | | | | | | | | |
|---|---|---|---|---|---|---|---|---|---|---|
| | B-Raf | HDAI | sub- | | CELL CYCLE AVG | | | CELL CYCLE SD | | |
| Cell line | uM | nM | G1 % | SD | G1 | G2/M | S | G1 | G2/M | S |
| Mel-P3-Pre | 0 | 0 | 3 | 1 | 65 | 10 | 24 | 1 | 1 | 1 |
| Mel-P3-Pre | 0.1 | 0 | 10 | 2 | 85 | 6 | 10 | 0 | 0 | 1 |
| Mel-P3-Pre | 1 | 0 | 12 | 2 | 90 | 6 | 5 | 0 | 0 | 0 |
| Mel-P3-Pre | 10 | 0 | 20 | 3 | 92 | 4 | 4 | 0 | 0 | 0 |
| Mel-P3-Pre | 0 | 30 | 17 | 2 | 70 | 21 | 9 | 1 | 1 | 1 |
| Mel-P3-Pre | 0.1 | 30 | 42 | 4 | 67 | 29 | 4 | 3 | 2 | 1 |
| Mel-P3-Pre | 1 | 30 | 52 | 5 | 64 | 30 | 6 | 5 | 3 | 3 |
| Mel-P3-Pre | 10 | 30 | 61 | 4 | 71 | 26 | 3 | 1 | 1 | 1 |
| Mel-P3-Post | 0 | 0 | 2 | 1 | 47 | 17 | 36 | 1 | 1 | 1 |
| Mel-P3-Post | 0.1 | 0 | 2 | 0 | 65 | 12 | 23 | 1 | 1 | 1 |
| Mel-P3-Post | 1 | 0 | 2 | 1 | 68 | 10 | 22 | 0 | 1 | 0 |
| Mel-P3-Post | 10 | 0 | 4 | 2 | 72 | 7 | 21 | 1 | 0 | 1 |
| Mel-P3-Post | 0 | 30 | 15 | 4 | 69 | 22 | 9 | 3 | 2 | 0 |
| Mel-P3-Post | 0.1 | 30 | 17 | 4 | 77 | 15 | 8 | 1 | 1 | 1 |
| Mel-P3-Post | 1 | 30 | 25 | 9 | 77 | 16 | 7 | 1 | 1 | 0 |
| Mel-P3-Post | 10 | 30 | 36 | 6 | 62 | 33 | 5 | 1 | 1 | 1 |
| Melanocytes (NHEM) | 0 | 0 | 1 | 0 | 88 | 3 | 6 | 1 | 1 | 1 |
| Melanocytes (NHEM) | 10 | 0 | 3 | 1 | 98 | 1 | 1 | 0 | 0 | 0 |
| Melanocytes (NHEM) | 0 | 30 | 1 | 1 | 88 | 7 | 5 | 1 | 0 | 1 |
| Melanocytes (NHEM) | 10 | 30 | 2 | 1 | 98 | 1 | 1 | 0 | 0 | 0 |

| | | | Annexin Staining per quadrant. | | | | Standard Deviation | | | |
|---|---|---|---|---|---|---|---|---|---|---|
| Cell line | B-Raf uM | HDAI nM | Upper Left | Upper Right | Lower Left* | Lower Right | Upper Left | Upper Right | Lower Left | Lower Right |
| Mel-P3-Pre | 0 | 0 | 1 | 2 | 95 | 2 | 0 | 0 | 0 | 0 |
| Mel-P3-Pre | 0.1 | 0 | 0 | 4 | 88 | 7 | 0 | 1 | 1 | 1 |
| Mel-P3-Pre | 1 | 0 | 0 | 6 | 85 | 8 | 0 | 1 | 2 | 1 |
| Mel-P3-Pre | 10 | 0 | 1 | 13 | 73 | 13 | 0 | 1 | 1 | 0 |
| Mel-P3-Pre | 0 | 30 | 1 | 6 | 85 | 8 | 0 | 0 | 1 | 0 |
| Mel-P3-Pre | 0.1 | 30 | 1 | 10 | 65 | 24 | 0 | 0 | 3 | 2 |
| Mel-P3-Pre | 1 | 30 | 1 | 11 | 52 | 35 | 0 | 1 | 4 | 4 |
| Mel-P3-Pre | 10 | 30 | 2 | 12 | 47 | 39 | 1 | 1 | 1 | 2 |
| Mel-P3-Post | 0 | 0 | 1 | 4 | 93 | 3 | 0 | 0 | 1 | 0 |
| Mel-P3-Post | 0.1 | 0 | 0 | 4 | 91 | 5 | 0 | 0 | 1 | 1 |
| Mel-P3-Post | 1 | 0 | 0 | 4 | 91 | 5 | 0 | 1 | 1 | 1 |
| Mel-P3-Post | 10 | 0 | 0 | 6 | 89 | 5 | 0 | 1 | 0 | 0 |
| Mel-P3-Post | 0 | 30 | 0 | 8 | 83 | 9 | 0 | 1 | 2 | 1 |
| Mel-P3-Post | 0.1 | 30 | 1 | 9 | 75 | 16 | 0 | 1 | 3 | 3 |
| Mel-P3-Post | 1 | 30 | 1 | 11 | 71 | 18 | 0 | 0 | 1 | 2 |
| Mel-P3-Post | 10 | 30 | 2 | 19 | 61 | 19 | 1 | 2 | 5 | 2 |

*Lower left is "healthy" cells

-continued

Sub-G1 analysis of dead cells (more cell lines)

| Cell line | B-Raf uM | HDAI nM | sub-G1 % | SD |
|---|---|---|---|---|
| Mel-P3-Pre | 0 | 30 | 17 | 2 |
| Mel-P3-Pre | 10 | 30 | 61 | 4 |
| Mel-P3-Post | 0 | 0 | 2 | 1 |
| Mel-P3-Post | 10 | 0 | 4 | 2 |
| Mel-P3-Post | 0 | 30 | 15 | 4 |
| Mel-P3-Post | 10 | 30 | 36 | 6 |
| Mel-P1-Pre | 0 | 0 | 9 | 1 |
| Mel-P1-Pre | 10 | 0 | 10 | 1 |
| Mel-P1-Pre | 0 | 30 | 21 | 1 |
| Mel-P1-Pre | 10 | 30 | 38 | 1 |
| Mel-P1-Post | 0 | 0 | 7 | 1 |
| Mel-P1-Post | 10 | 0 | 10 | 1 |
| Mel-P1-Post | 0 | 30 | 14 | 4 |
| Mel-P1-Post | 10 | 30 | 23 | 1 |
| Mel-P4-Pre | 0 | 0 | 9 | 1 |
| Mel-P4-Pre | 10 | 0 | 58 | 2 |
| Mel-P4-Pre | 0 | 30 | 40 | 7 |
| Mel-P4-Pre | 10 | 30 | 87 | 1 |
| Mel-P4-Post | 0 | 0 | 17 | 1 |
| Mel-P4-Post | 10 | 0 | 54 | 2 |
| Mel-P4-Post | 0 | 30 | 24 | 1 |
| Mel-P4-Post | 10 | 30 | 86 | 4 |

JC1 Staining for mitochondrial depolarisation

| Cell line | B-Raf uM | HDAI | Depolarised mitochondria | SD |
|---|---|---|---|---|
| Mel-P3-Post | 0 | 0 | 92 | 0 |
| Mel-P3-Post | 5 | 0 | 88 | 1 |
| Mel-P3-Post | 0 | 30 | 86 | 2 |
| Mel-P3-Post | 5 | 30 | 62 | 2 | z-VAD-fmk-FITC staining for caspase positive cells

| Cell line | B-Raf uM | HDAI nM | z-VAD-fmk positive | SD |
|---|---|---|---|---|
| Mel-P3-Post | 0 | 0 | 7 | 4 |
| Mel-P3-Post | 5 | 0 | 14 | 1 |
| Mel-P3-Post | 0 | 30 | 23 | 1 |
| Mel-P3-Post | 5 | 30 | 43 | 3 |

The B-Raf inhibitor of Formula (I) was tested on the matched pre and post cell lines established from patients before treatment and after progression on vemurafenib treatment. B-Raf inhibitor of Formula (I) caused potent G1 arrest and cell-line dependent apoptosis in Baf-mutant melanoma. In the Mel-P3 melanoma cell line, B-Raf inhibitor of Formula (I) causes potent G1 arrest and low level apoptosis in the "pre" cell line, and a weaker G1 arrest an no apoptosis in the "post" cell line. Combining panobinostat with the B-Raf inhibitor of Formula (I), caused a synergistic increase in apoptosis in melanoma lines. The increase in apoptosis was also observed in the "post" cell lines which had previously acquired resistance to the B-Raf inhibitor, vemurafenib. This suggests that histone deacetylase inhibitors can reverse acquired resistance to B-Raf inhibition in melanoma and can allow B-Raf inhibition to induce apoptosis in resistant lines. A number of different matched cell lines were tested and although sensitivity was variable, panobinostat and the B-Raf inhibitor of Formula (I) acted to synergistically increase apoposis (Chou and Talalay method). Melanocytes did not die in response to treatment of the histone deacetylse inhibitor panobinostat; the B-Raf inhibitor of Formula (I) or both in combination.

Cellular events associated with the cell death that results from treatment of vemurafenib resistant melanoma cells with the combination of B-Raf inhibitor of Formula (I) and panobonostat are also investigated. Mel-P3-post cells, which do not undergo apoptosis in response to B-Raf inhibition alone, are the primary focus. The combination of the B-Raf inhibitor of Formula (I) and panobinostat increased the number of cells with activated caspase and resulted in cells losing mitochondria outer membrane potential. Additionally PARP cleavage was observed cells treated with the combination of drugs. PARP cleavage was also observed in the Mel-P3-pre cells, Which also undergo B-Raf inhibitor induced apoptosis which is synergistically increased by panobinostat. These observations suggest an activation of a classical apopotosis cascade involving mitochondrial depolarization.

Example 2

To investigate how histone deacetylase inhibition may sensitize melanoma cells to B-Raf inhibition, gene expression analysis is performed on both pre- and post-treatment cells treated with B-Raf inhibitor alone and compared it with cells treated with a combination of B-Raf inhibitor and histone deacetylase inhibitor. As a large number of genes were changed in response to histone deacetylase inhibitor in a cell line specific manner, we sought to identify cellular pathways that may be important targets of the histone deacetylase inhibitor treatment. Gene Set Enrichment Analysis (GSEA) was performed for each cell line comparing B-Raf inhibition alone to the combination. Results for all lines were combined using metaGSEA using GenePattern software and the C5 cellular processes gene sets.

Upregulated by Histone Deacetylase Treatment:
membrane fusion
regulation of mapk cascade
fatty acid metabolic process
amino acid derivative metabolic process
carbohydrate_transport
steroid metabolic process
response to extracellular stimulus
ion homeostasis
transmembrane receptor protein tyrosine kinase signaling pathway
monocarboxylic acid metabolic process
Downregulated by Histone Deacetylase Treatment:
cytokine secretion
activation of jnk activity
positive regulation of jnk activity
viral genome replication
regulation of jnk activity
nucleobase nucleoside and nucleotide metabolic process
humoral immune response
nucleotide metabolic process
nucleotide biosynthetic process
tRNA metabolic process

CONCLUSIONS

Histone deacetylase inhibitors show promise as a combination treatment with B-Raf inhibitors. The combination may be effective as both a first-line treatment and for patients failing initial single agent B-Raf inhibitor treatment.

The B-Raf inhibitor of Formula (I) showed potent cell cycle inhibition and cell line-dependent apoptosis that was enhanced by the addition of a histone deacetylase inhibitor. The histone deacetylase inhibitor was able to sensitize melanoma cells to death induced by the B-Raf inhibitor, even in cell lines with previously acquired resistance to BRAF inhibitors.

The invention claimed is:

1. A pharmaceutical combination comprising:
(a) a B-Raf inhibitor of the formula (I)

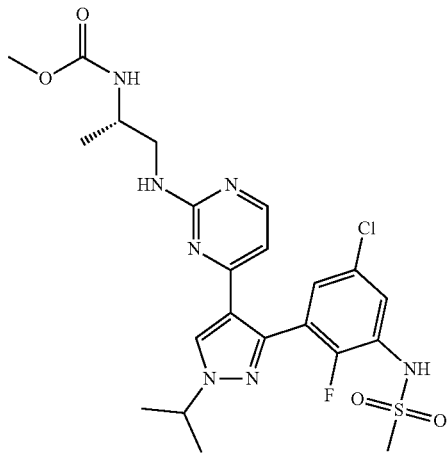

(I)

or a pharmaceutically acceptable salt thereof, and
(b) a histone deacetylase inhibitor which is panobinostat, or a pharmaceutically acceptable salt thereof, for simultaneous, separate or sequential administration.

2. A method for treating a melanoma in a human patient, comprising the simultaneous, separate or sequential administration of a therapeutically effective amount of
(a) a B-Raf inhibitor of the formula (I)

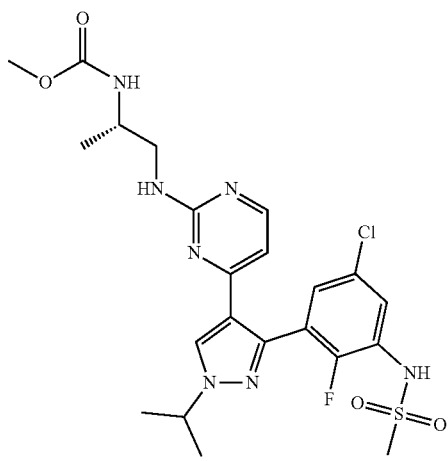

(I)

or a pharmaceutically acceptable salt thereof, and
(b) a histone deacetylase inhibitor which is panobinostat, to a patient having a proliferative disease.

3. A method according to claim 2, wherein the melanoma is characterized by a B-Raf mutation.

4. A method according to claim 3, wherein the melanoma is characterized by a B-Raf V600 mutation.

5. A combined preparation, which comprises:
(a) a B-Raf inhibitor of the formula (I)

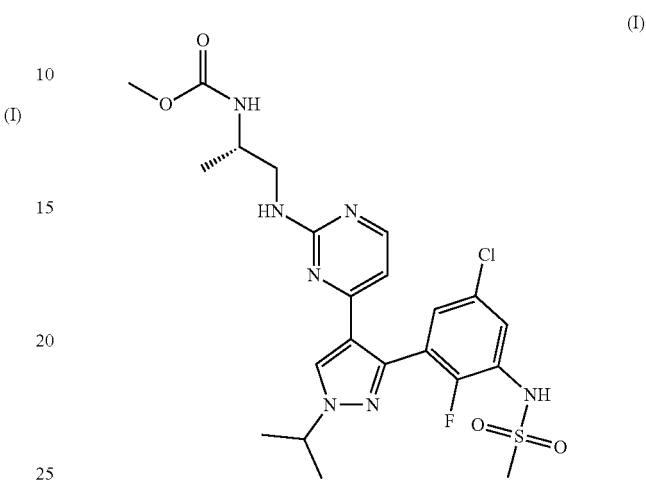

(I)

or a pharmaceutically acceptable salt thereof, and
(b) a histone deacetylase inhibitor, which is panobinostat, or a pharmaceutically acceptable salt thereof,
for simultaneous, separate or sequential administration.

6. A pharmaceutical composition comprising:
(a) a B-Raf inhibitor of the formula (I)

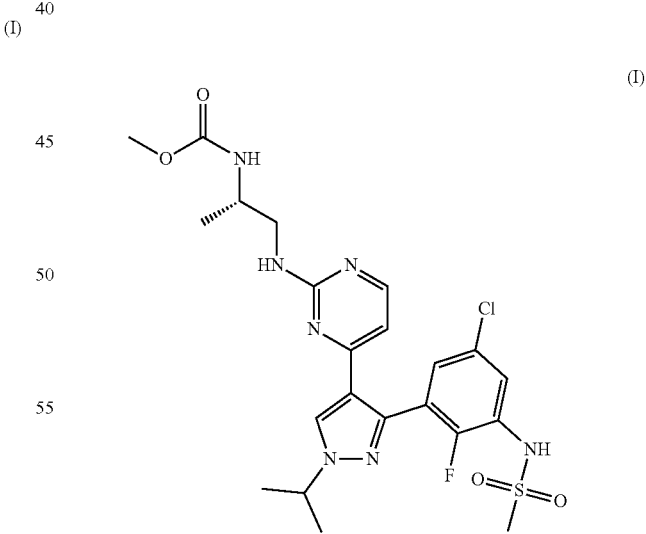

(I)

or a pharmaceutically acceptable salt thereof, and
(b) a histone deacetylase inhibitor, which is panobinostat, or a pharmaceutically acceptable salt thereof.

7. A commercial package comprising
(a) a B-Raf inhibitor of the formula (I)

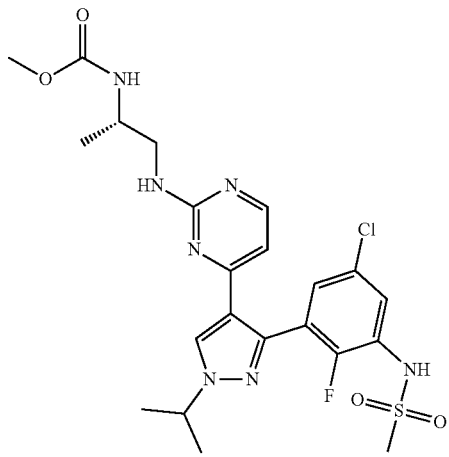
(I)

or a pharmaceutically acceptable salt thereof, and (b) a histone deacetylase inhibitor, which is panobinostat, or a pharmaceutically acceptable salt thereof, together with instructions for simultaneous, separate or sequential administration thereof for use in the delay of progression or for the treatment of a proliferative disease.

8. The commercial package according to claim 7, wherein the B-Raf inhibitor of the formula (I) and panobinostat are each provided in a separate unit dosage form.

9. The method of claim 2, wherein the melanoma is resistant to treatment with a B-Raf inhibitor alone, wherein the B-Raf inhibitor is vemurafinib or the compound of formula (I).

* * * * *